United States Patent
Govindarajan et al.

(10) Patent No.: US 11,853,772 B2
(45) Date of Patent: *Dec. 26, 2023

(54) INDEPENDENT OPERATION OF AN ETHERNET SWITCH INTEGRATED ON A SYSTEM ON A CHIP

(71) Applicant: TEXAS INSTRUMENTS INCORPORATED, Dallas, TX (US)

(72) Inventors: Sriramakrishnan Govindarajan, Bengaluru (IN); Denis Roland Beaudoin, Rowlett, TX (US); Gregory Raymond Shurtz, Houston, TX (US); Santhanakrishnan Badri Narayanan, Bengaluru (IN); Mark Adrian Bryans, Dallas, TX (US); Mihir Narendra Mody, Bengaluru (IN); Jason A. T. Jones, Richmond, TX (US); Jayant Thakur, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,533

(22) Filed: Aug. 16, 2022

(65) Prior Publication Data

US 2022/0391219 A1 Dec. 8, 2022

Related U.S. Application Data

(63) Continuation of application No. 16/700,254, filed on Dec. 2, 2019, now Pat. No. 11,436,024.
(Continued)

(51) Int. Cl.
*G06F 9/4401* (2018.01)
*H04L 45/00* (2022.01)
(Continued)

(52) U.S. Cl.
CPC .......... *G06F 9/4418* (2013.01); *G06F 9/4406* (2013.01); *G06F 13/28* (2013.01);
(Continued)

(58) Field of Classification Search
CPC ............... H04L 12/437; H04L 12/4625; H04L 12/4637; H04L 12/42; H04L 12/422;
(Continued)

(56) References Cited

U.S. PATENT DOCUMENTS 8,407,773 B1    3/2013   Hayter
8,495,422 B2    7/2013   Mezhibovsky
(Continued)

OTHER PUBLICATIONS

Texas Instruments. "AM65x/DRA80xM Processors." Technical Reference Manual. SPRUID7D, April 2018—Revised Jun. 2019. pp. 1-9, 565-593, 711-769, 770, 1933-1957, 3663-3712, 3714-3768, 4748-5749, 6410-6922, 8704-8728.
(Continued)

*Primary Examiner* — Faisal M Zaman
(74) *Attorney, Agent, or Firm* — Carl G. Peterson; Frank D. Cimino (57) ABSTRACT

An Ethernet switch and a switch microcontroller or CPU are integrated onto a system-on-a-chip (SoC). The Ethernet switch remains independently operating at full speed even though the remainder of the SoC is being reset or is otherwise nonoperational. The Ethernet switch is on a separated power and clock domain from the remainder of the integrated SoC. A warm reset signal is trapped by control microcontroller (MCU) to allow the switch CPU to isolate the Ethernet switch and save state. When the Ethernet switch is isolated and operating independently, the warm reset request is provided to the other entities on the integrated SoC. When warm reset is completed, the state is restored and the various DMA and flow settings redeveloped in the
(Continued)

integrated SoC to allow return to normal operating condition.

22 Claims, 4 Drawing Sheets

Related U.S. Application Data (60) Provisional application No. 62/785,558, filed on Dec. 27, 2018.

(51) Int. Cl.
*H04L 47/32* (2022.01)
*G06F 13/28* (2006.01)
*H04L 49/351* (2022.01)

(52) U.S. Cl.
CPC .............. *H04L 45/54* (2013.01); *H04L 45/66* (2013.01); *H04L 47/32* (2013.01); *H04L 49/351* (2013.01)

(58) Field of Classification Search
CPC ......... H04L 45/54; H04L 45/66; H04L 47/32; H04L 49/351; H04L 49/109; G06F 15/78; G06F 15/7825; G06F 13/4022; G06F 11/22; G06F 9/4418; G06F 9/4406; G06F 13/28
USPC ........ 709/251, 250, 227; 370/356, 351, 352, 370/360, 388; 710/316
See application file for complete search history.

(56) References Cited

U.S. PATENT DOCUMENTS

| | | | |
|---|---|---|---|
| 9,851,770 B1 | 12/2017 | Zhang | |
| 10,004,120 B1* | 6/2018 | Bell | H04L 12/10 |
| 10,013,299 B2 | 7/2018 | Wang | |
| 11,436,024 B2* | 9/2022 | Govindarajan | H04L 45/66 |
| 11,715,748 B2* | 8/2023 | Sato | H01L 27/14614 |
| | | | 257/291 |
| 2002/0144177 A1 | 10/2002 | Kondo | |
| 2003/0091042 A1* | 5/2003 | Lor | H04L 63/101 |
| | | | 726/13 |
| 2004/0267999 A1* | 12/2004 | Larson | G06F 11/0727 |
| | | | 710/301 |
| 2008/0240103 A1* | 10/2008 | Schmidt | H04L 45/00 |
| | | | 370/392 |
| 2009/0037550 A1* | 2/2009 | Mishra | G06F 11/203 |
| | | | 709/208 |
| 2009/0177807 A1* | 7/2009 | Wong | G06F 13/4022 |
| | | | 710/18 |
| 2014/0086051 A1 | 3/2014 | Engebretsen | |
| 2014/0122833 A1 | 5/2014 | Davis | |
| 2014/0208135 A1* | 7/2014 | Keil | G06F 1/3234 |
| | | | 713/320 |
| 2014/0351484 A1* | 11/2014 | Freking | G06F 13/4022 |
| | | | 710/314 |
| 2014/0369085 A1 | 12/2014 | Motoki | |
| 2016/0048693 A1* | 2/2016 | Üner | G06F 21/604 |
| | | | 713/189 |
| 2016/0087480 A1* | 3/2016 | Trudeau | H02J 7/007 |
| | | | 320/108 |
| 2016/0277318 A1* | 9/2016 | Guntaka | H04L 41/0813 |
| 2017/0168747 A1 | 6/2017 | Han | |
| 2017/0357808 A1* | 12/2017 | Arroyo | G06F 21/57 |
| 2020/0192453 A1 | 6/2020 | Rathbun | |
| 2020/0363851 A1 | 11/2020 | Bin Muhamad Azmi | |
| 2021/0405835 A1 | 12/2021 | Werner | |

OTHER PUBLICATIONS

Texas Instruments. "TCI6638K2K Multicore DSP+ARM® KeyStone™ II System-on-Chip (SoC)." Data Sheet. SPRS826G—Nov. 2012—Revised Oct. 2017. pp 1-329.

Texas Instruments. "KeyStone Architecture Mulitcore Navigator." User's Guide. SPRUGR9H, Nov. 2010—Revised Apr. 2015. pp 1-156.

Texas Instruments. "KeyStone II Architecture Network Coprocessor (NETCP) for K2E and K2L Devices." User's Guide. SPRUHZ0, Aug. 2014. pp 1-17.

Texas Instruments. "KeyStone Architecture Gigabit Ethernet (GbE) Switch Subsystem." User's Guide. SPRUGV9D. Nov. 2010—Revised Jun. 2013. pp 1-259.

Microsemi. "VSC7513 8—Port L2 Gigabit Ethernet Switch." Dec. 2016. 2 pages.

Kugel, Alex. "A Carrier-Grade Ethernet Switch in on SoC." Altera Corp. Jun. 2015. 8 pages.

* cited by examiner

INDEPENDENT OPERATION OF AN ETHERNET SWITCH INTEGRATED ON A SYSTEM ON A CHIP

RELATED APPLICATIONS

This application is a continuation of U.S. patent application Ser. No. 16/700,254, filed on Dec. 2, 2019, which claims priority to U.S. Provisional Application No. 62/785,558, filed on Dec. 27, 2018, both of which are hereby incorporated by reference.

BACKGROUND

1. Field

The field relates to Ethernet switches and system on a chip (SoC) devices.

2. Description of the Related Art

Electronics in automobiles are increasing daily. In addition to the conventional engine controller, transmission controller, infotainment unit, body controller and the like, the advent of numerous safety systems is greatly increasing the processing done inside an automobile. For example, adaptive cruise control requires the intercommunication between a radar system and an engine controller system. As another example, in a bird's eye view display, outputs from a number of different cameras arranged at various locations are provided to a processor to process the received video and develop the resultant bird's eye view image, which is then provided to the infotainment system for display to the driver. The advance in the performance and number of processors present in automobile has increased the need for higher speed and higher-quality communications between the various processors.

While in the past, control area network (CAN) bus networks have been satisfactory, with the advent of the high data transfer rates needed, automobiles have begun using Ethernet interconnects. Typically, a relevant module, such as a camera or a processing unit, includes an Ethernet port connected to an Ethernet switch, which allows communications between the various devices. However, this need for a separate Ethernet switch has further increased the complexity of the automobile by requiring both the Ethernet switch hardware and a processor to control the switch. Thus, yet one more module has been added to the electronics in an automobile. This proliferation of modules increases cost, due to the actual cost of the module itself and due to the increased complexity of the system design and the communications between the various modules. A reduction in the number and complexity of modules present in an automobile without sacrificing reliability or performance will help reduce cost and system design time.

SUMMARY

In one design, an Ethernet switch is integrated onto a system-on-a-chip (SoC) utilized in an automotive environment. A switch microcontroller or CPU is also integrated to manage the Ethernet switch. Because the Ethernet switch is providing a path between numerous modules in the automobile, the Ethernet switch must be highly reliable and not fail or stop operating if other devices on the integrated SoC develop problems. In other words, the Ethernet switch must keep independently operating at full speed even though the remainder of the SoC is being reset or is otherwise nonoperational.

As a first portion of this capability, the Ethernet switch is on a separated power and clock domain from the remainder of the integrated SoC. By isolating the Ethernet switch from the remainder of the integrated SoC, the Ethernet switch may continue operating even if the rest of the integrated SoC is powered down, is undergoing reset operations or is otherwise nonoperational. This isolation is performed by having various signals, such as a warm reset signal, be provided to a control microcontroller (MCU) rather than directly to system hardware. The MCU recognizes the warm reset request and issues a communication to the switch CPU, which then commences an operation to isolate the Ethernet switch from the remainder of the integrated SoC and to store its own state. When the Ethernet switch is isolated and operating independently, that status is acknowledged by the switch CPU and the warm reset request is communicated by the MCU to the system so that all other entities on the integrated SoC go through a warm reset operation. The intercepting of the warm reset request by the MCU allows various other software-based functions to be developed to allow the components on the integrated SoC to be prepared for the reset that will occur and to allow continued independent operation, as in the case of the Ethernet switch.

When the various devices on the integrated SoC have completed warm reset, the state of the switch CPU is restored and the various DMA and flow settings redeveloped in the integrated SoC to allow return to normal operating condition. Therefore, the Ethernet switch remains operational even though the remainder of the integrated SoC is not operational. This independent operation allows the integrated Ethernet switch to be utilized in place of the independent Ethernet switches of the prior art, thus reducing module count and complexity.

BRIEF DESCRIPTION OF THE FIGURES

For a detailed description of various examples, reference will now be made to the accompanying drawings in which.

DETAILED DESCRIPTION

Figure 1:
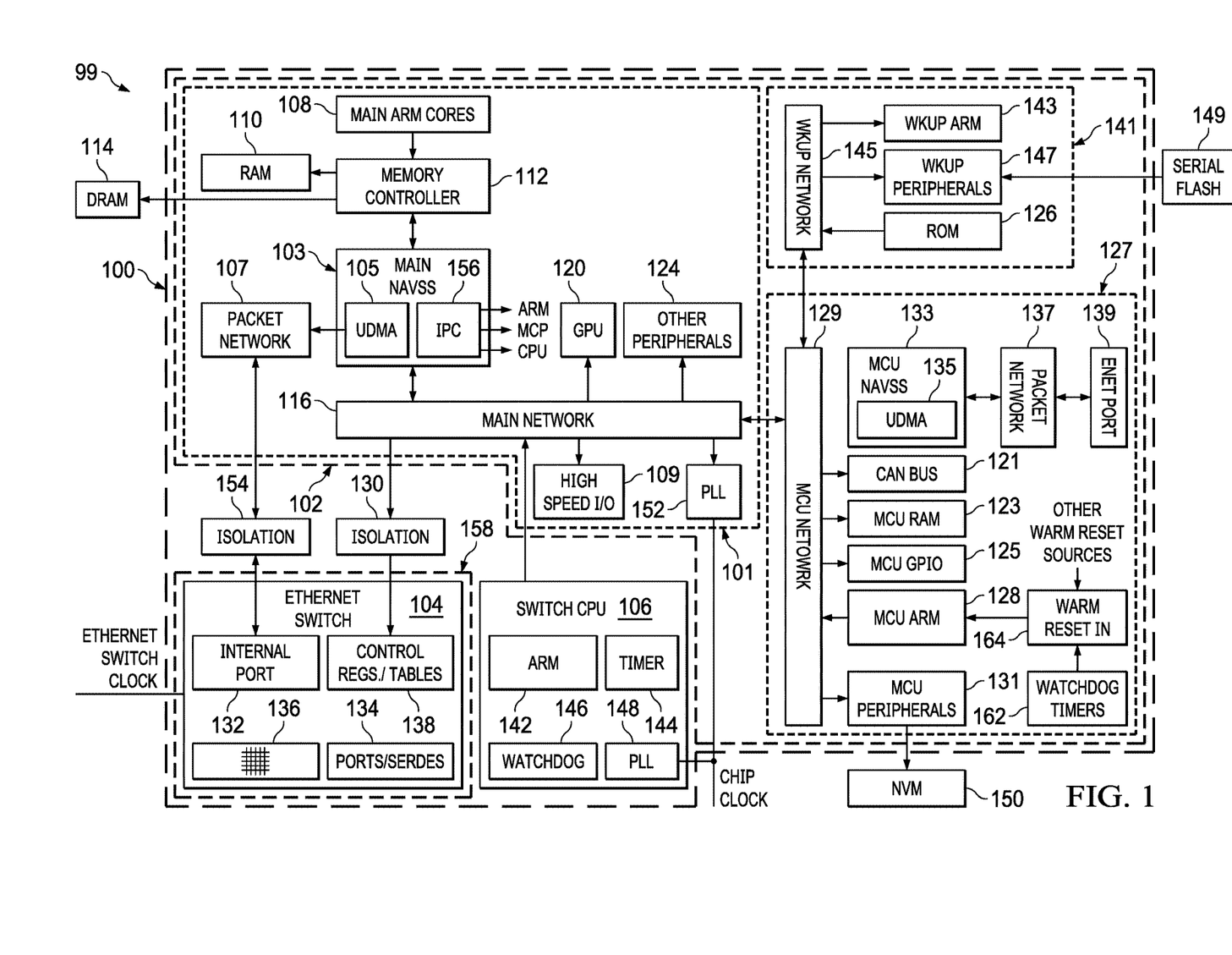
FIG. 1 is a block diagram of an Ethernet switch and switch CPU integrated into an integrated SoC.

Referring now to FIG. 1, an SoC 100 integrating an Ethernet switch 104 is illustrated. This SoC integrating the Ethernet switch will be referred to as the integrated SoC 100 for ease of reference. The integrated SoC 100 generally contains the components 102 of an SoC as would be used in an automobile, along with an Ethernet switch 104 and an Ethernet switch CPU 106 to control the Ethernet switch 104.

The integrated SoC 100 in combination with various programmed memories is considered the integrated SoC system 99. One example of the components is described in AM65x/ DRA80xM Processors, Technical Reference Manual, Literature Number SPRUID7D, Revised June 2019, from Texas Instruments, available at www.ti.com/lit/pdf/spruid7, which is hereby incorporated by reference. Various components, configurations and interconnections to be described below are also present to allow the Ethernet switch 104 to operate while the components 102 are powered down, are in reset or are otherwise nonoperational.

A MAIN subsystem 101 contains the primary operating components of the integrated SoC 100. A plurality of MAIN ARM microprocessor cores 108 are the primary processing components of the components 102. The MAIN ARM cores 108 are connected to a memory controller 112. The memory controller 112 is connected to DRAM 114 which provides the bulk of the memory of the system and to onboard RAM 110. The memory controller 112 is also connected to a MAIN NAVSS (Navigator subsystem) 103 that acts as an interface between the memory controller 112 and a MAIN data network 116. The MAIN data network 116 in one embodiment is a switched fabric allowing any master device to connect to any slave device and many master devices to connect to many slave devices at the same time. The MAIN NAVSS 103 includes a UDMA (unified direct memory access) controller 105. The UDMA controller 105 includes a series of DMA channels, flow entries, and queues used to manage the various transfers. The UDMA controller 105 is connected to a packet data network 107. The packet data network 107 is also a switched fabric but is used primarily for packet transfers, such as Ethernet packets.

A graphics processing unit 120 is connected to the MAIN data network 116 as a slave. A high-speed input/output (I/O) block 109 is connected to the MAIN data network 116 as a slave to handle other high-speed communications. For simplification, all other peripherals present in the integrated SoC 100 are in peripheral module 124, which is connected to the MAIN data network 116 as a slave. An integrated SoC 100 PLL 152 receives a chip clock signal and provides the clocking to the components in the integrated SoC 100 other than the Ethernet switch 104. The PLL 152 is a slave on the MAIN data network 116.

A microcontroller unit (MCU) subsystem 127 handles operation of the integrated SoC 100 when the MAIN subsystem 101 is powered down to save energy. An MCU ARM processor 128 is connected to an MCU data network 129 as a master. The MCU data network 129 is connected to the MAIN data network 116 to allow communication between the MAIN subsystem 101 and the MCU subsystem 127. An MCU general purpose I/O (GPIO) block 125 is connected to the MCU data network 129 as a slave. Watchdog timers 162, present in both the MCU domain 127 and the MAIN domain 101, provide an indication that a warm reset is needed to a Warm Reset block 164 to. Other warm reset sources, such as external pins of the SoC 100, register bits that can be written by software executing on any of the various processors in the SoC 100 and other watchdog timers, provide warm reset requests to the Warm Reset block 164. The Warm Reset block 164 sources or provides an interrupt to the MCU ARM 128 when a warm reset is needed or requested. The MCU ARM 128 is connected to registers (not shown) for each MAIN ARM core 108, the switch CPU 106 and the MCU ARM 128. In an example, the MCU ARM 128 provides a warm reset signal to the respective registers for the designated processor or processors and a reset signal is provided from the register to the processor. The registers act as sinks for the warm reset signal from the MCU ARM 128 and provide the respective reset signal to the associated processor. MCU RAM 123 is connected to the MCU data network 129 as a slave and acts as local memory for the MCU ARM 128. A CAN bus block 121 is connected to the MCU data network 129 as a slave to allow operation with a CAN bus environment in the automobile. For simplicity, the other MCU peripherals are represented in MCU peripherals block 131 that is connected to the MCU data network 129 as a slave. A MCU NAVSS 133 is connected to the MCU data network 129 as a master. The MCU NAVSS 133 includes a UDMA controller 135. An MCU packet data network 137 is connected to the MCU NAVSS 133 and an Ethernet block 139. Nonvolatile memory (NVM) 150 is connected to the MCU peripherals 131, which allows access by the MCU ARM 128 and the switch CPU 106.

A wakeup (WKUP) subsystem 141 performs boot and various initialization operations for the integrated SoC 100. A boot or WKUP ARM processor 143 is the processor in the WKUP subsystem 141. A WKUP data network 145 is the interconnect in the WKUP subsystem 141 and is connected to the MCU data network 129. A read only memory (ROM) 126 is connected to the WKUP data network 145 as a slave to provide boot programs for the WKUP ARM 143. WKUP peripherals 147 are connected to the WKUP data network 145 as a slave. A serial flash memory 149 is connected to the WKUP peripherals and contains the programs executed by the MCU ARM 128, the switch CPU 106 and the MAIN ARM cores 108. The WKUP subsystem 141 loads the programs in the serial flash memory 149 into one of the RAM 110, DRAM 140 and MCU RAM 123 and the MCU ARM 128 boots and begins operation. The MCU ARM 128 loads the needed programs for the switch CPU 106 and the MAIN ARM cores 108 into the appropriate of RAM 110 and DRAM 140 and then the switch CPU 106 and the MAIN ARM cores 108 boot and begin operations.

The Ethernet switch 104 is connected to the MAIN data network 116 through an isolation module 130 to allow access to control registers 138 in the Ethernet switch 104. For internal Ethernet packet transfers, the Ethernet switch 104 is connected through an isolation block 154 to the packet data network 107 to allow the MAIN UDMA controller 105 to handle the Ethernet packet transfers, forming a host or internal port.

The Ethernet switch 104 internally includes an internal port 132 used with the packet data network 107. A series of external ports and SERDES 134 are also present in the Ethernet switch 104. In one design there are eight external facing ports of the Ethernet switch 104, with those ports including the necessary medium access control (MAC) and physical layer (PHY) modules, including the serializer/ deserializer (SERDES). A switching fabric 136 connects the ports 134 and the internal port 132 to provide the actual switching function of the Ethernet switch 104. A series of control registers 138, which in one design contain the various tables, such as a routing table, that control the operation of Ethernet switch 104, are also present. An address lookup engine (ALE) or packet classifier (not shown) uses the entries and tables to route the various Ethernet packets. A separate external Ethernet switch clock signal is received by the Ethernet switch 104.

The switch CPU 106 is connected to the MAIN data network 116 and operates as a master. The switch CPU 106 includes an ARM processor 142, a timer 144, and a watchdog timer 146. The timer 144 and watchdog timer 146 are used for Ethernet switch operation and are only for the ARM processor 142 and not remaining portions of the integrated SoC 100. A phase locked loop (PLL) 148 is provided to handle clocking of the switch CPU 106 and receives the chip clock signal.

An inter-processor communication (IPC) register or module 156 is located in the MAIN NAVSS 103 and provides interrupts to the MAIN ARM cores 108, the MCU ARM 128 and the switch CPU 106 to allow communication between the various processors in the integrated SoC 100. IPC registers (not shown) may be present in other locations, such as associated with the MCU ARM 128 or switch CPU 106 and those other IPC registers may be used instead of the IPC register 156.

The Ethernet switch 104 is contained in a separate power island or plane 158 that allows isolation of the Ethernet switch 104 from the remainder of the components in the integrated SoC 100. This location in a separate power plane allows the Ethernet switch 104 to continue operating independently even though the remainder of the integrated SoC 100 may not be operational. The isolation modules 130 and 154 provide this isolation function from the MAIN data network 116 and packet data network 107. The various portions that form the ports and SERDES 134 are similarly located in this isolated island 158 so that the Ethernet switch 104 can continue operating at all times.

It is understood that the above description is of one design of an integrated SoC 100 and many other designs can be used. Different designs of the components 102 are presumed, with different specific designs of the Ethernet switch 104 and switch CPU 106 operable as well. The Ethernet switch 104 remains operational to switch any flows for devices that are already present in the routing tables of the Ethernet switch 104. Programming of any new routes is delayed until the switch CPU 106 and any other needed components are operational. As adding new routes is an infrequent occurrence when the automobile has started, normal operations are not hindered in practice.

In addition, in one design the various DMA channels, registers, IPC channels, and the like used in the operation of the switch CPU 106 and the Ethernet switch 104 are hardware firewalled to prevent alteration or use by unauthorized modules.

Figure 2:
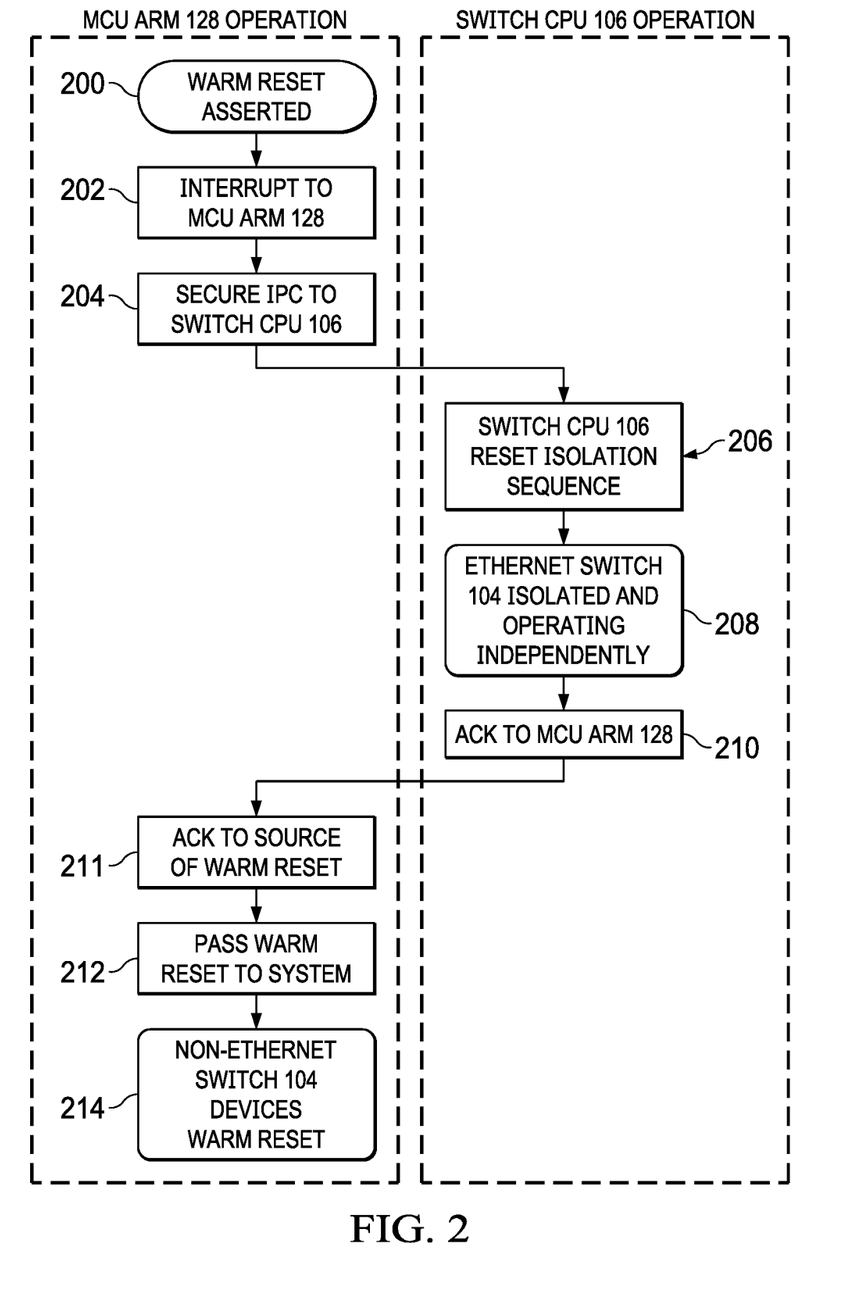
FIG. 2 is a flowchart of reset initiation operations of the Ethernet switch in the integrated SoC.
Figure 4:
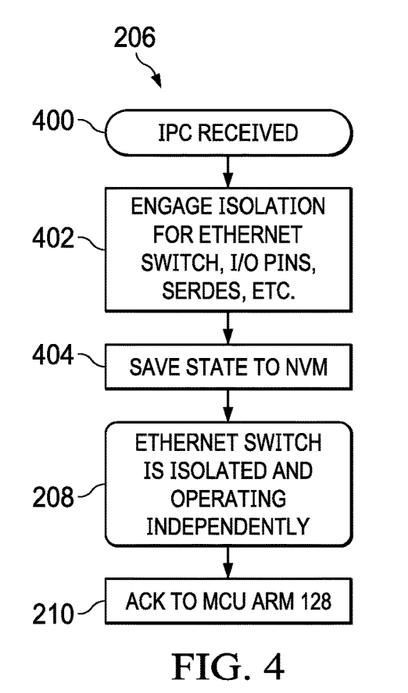
FIG. 4 is a flowchart of the reset isolation sequence of FIG. 2.

Referring now to FIG. 2, operations of the MCU ARM 128 and the switch CPU 106 necessary to allow the various components in the integrated SoC 100, besides the Ethernet switch 104, such as the MAIN ARM cores 108, the MCU ARM 128, the switch CPU 106, the peripherals 124 and the MCU peripherals 131, to be warm reset are illustrated. To allow the Ethernet switch 104 to continue to operate even when the remainder of the integrated SoC 100 is not operating, such as during warm reset or when portions of the integrated SoC 100 are powered down, a warm reset interrupt is provided from the Warm Reset block 164 to the MCU ARM 128. This allows various isolation operations to be performed to allow the Ethernet switch 104 to continue to operate independently. In step 200 a warm reset request is received. In step 202 this warm reset request causes an interrupt to the MCU ARM 128. In step 204, the MCU ARM 128 provides an IPC notification request indicating the need to perform operations to prepare for a warm reset, including isolating the Ethernet switch 104, to the switch CPU 106 using the IPC registers 156. In response to receiving the notification of the IPC from the MCU ARM 128, the switch CPU 106 performs a reset isolation sequence at step 206. FIG. 4 and the accompanying text further describe the reset isolation sequence. After completion of the reset isolation sequence of step 206, the Ethernet switch 104 is isolated and operating independently as indicated in step 208. In step 210, after the switch CPU 106 is finished isolating the Ethernet switch 104, an ACK or acknowledge is provided to the MCU ARM 128 using the IPC registers 156 as a notification that the Ethernet switch 104 is isolated and any other warm reset preparation is complete. In response to receiving the ACK indication from the IPC registers 156, in step 211 the MCU ARM 128 provides an acknowledgement to the source of the warm reset request (e.g., watchdog timer 162 or a register). In step 212 the MCU ARM 128 provides a warm reset signal to the appropriate register for the device or devices being reset. In step 214 the non-Ethernet switch device or devices enter a warm reset condition.

Figure 3:
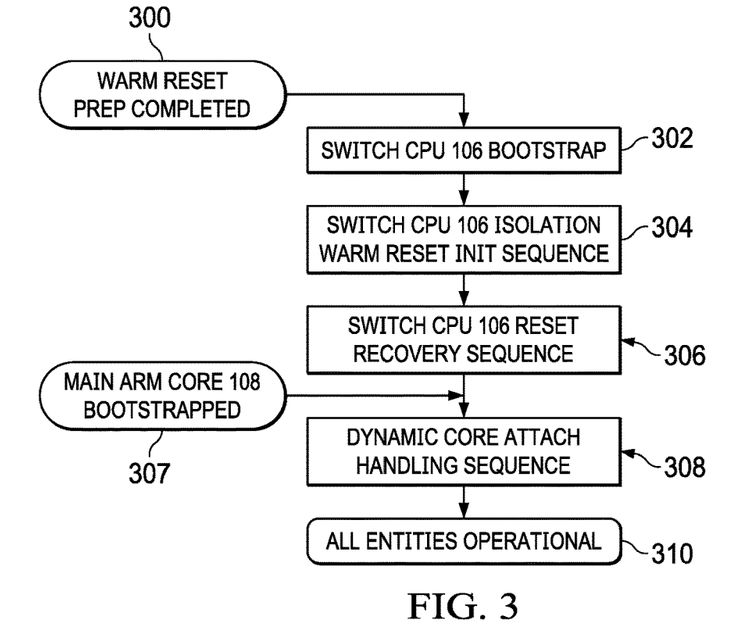
FIG. 3 is a flowchart of restart operations after a warm reset of the integrated SoC of FIG. 2.
Figure 5:
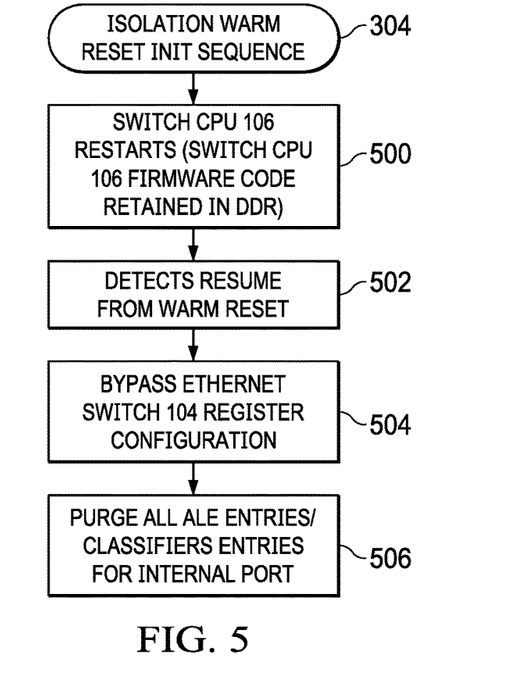
FIG. 5 is a flowchart of the initialization sequence of FIG. 3.
Figures 6, 7:
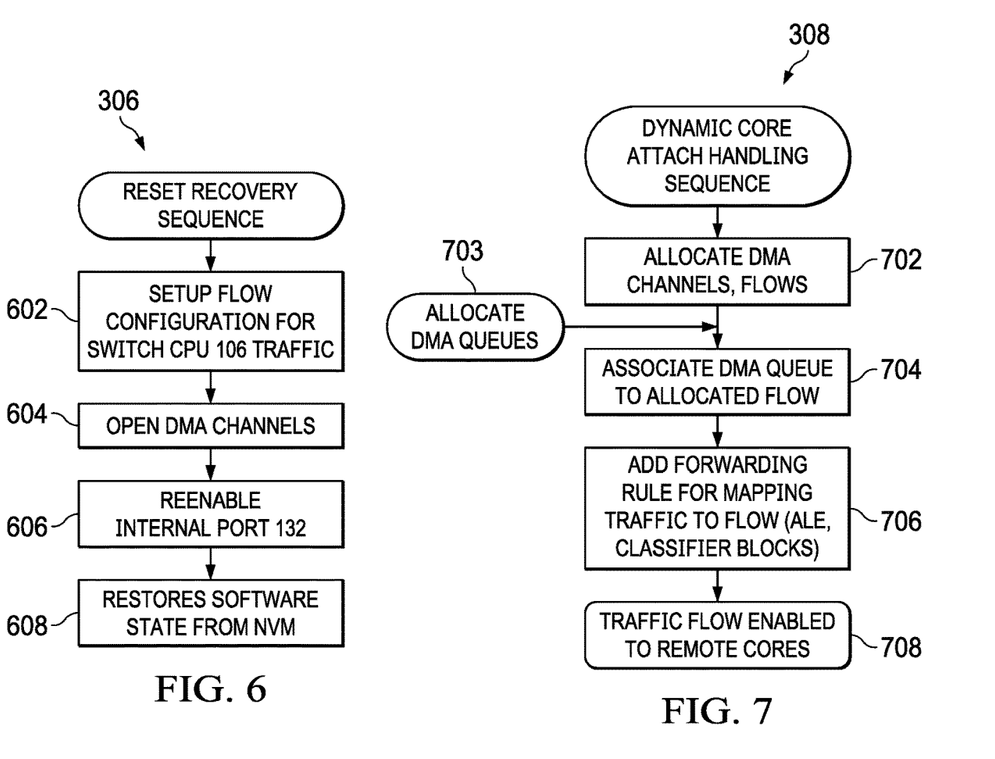
FIG. 6 is a flowchart of the reset recovery sequence of FIG. 3.
FIG. 7 is a flowchart of the dynamic core attaching handling sequence of FIG. 3.

Because of the warm reset operation, it is necessary to boot the various devices, such as the MAIN ARM cores 108, the MCU ARM 128 and the switch CPU 106, and redevelop any needed data flows through the Ethernet switch 104, which is isolated from the remainder of the integrated SoC 100. Referring now to FIG. 3, in step 300 the MCU ARM 128 has completed reset and has set up the boot environment for the switch CPU 106. In step 302 the switch CPU 106 commences bootstrapping. After the bootstrap is completed, in step 304 the switch CPU 106 performs a isolation warm reset initialization sequence. FIG. 5 and the accompanying text further describe the isolation warm reset initialization sequence. Next, the switch CPU 106 performs a reset recovery sequence in step 306 to recover the state of the Ethernet switch 104 and the Ethernet switch 104 is fully operational. FIG. 6 and the accompanying text further describe the reset recovery sequence. In step 307, a MAIN ARM core 108 will have bootstrapped and will be ready to operate with the Ethernet switch 104 and provide such indication to the switch CPU 106. Then in step 308 the switch CPU 106 performs a dynamic core attached handling sequence. FIG. 6 and the accompanying text further describe the dynamic core attach handling sequence. After step 308, all the entities in the integrated SoC 100 are operational. Step 307 is executed by each MAIN ARM core 108 as it becomes ready and step 308 is performed for that MAIN ARM core 108.

The CPU switch reset isolation sequence step 206 is further detailed in FIG. 4. In step 400 an IPC is received at the switch CPU 106 from the IPC registers 156. The switch CPU 106 isolates the Ethernet switch 104 by placing the internal port 132 in a non-forwarding state and activating the isolation modules 130 and 154 and isolates the various I/O pins, SERDES and other components related to the Ethernet switch 104 so that the entire Ethernet switch 104 is electrically isolated from the remainder of the integrated SoC 100. In step 404 the state of the switch CPU 106 is saved to the NVM 150. The NVM 150 stores the switch startup configuration information and any updated switch configuration information and state information for switch control protocols that are executing on the switch CPU 106, including information of protocol state machines such as time sync, VLAN, multicast membership and so on. In step 208 the Ethernet switch 104 is isolated and operating independently. In step 210 an acknowledge or ACK is provided by the switch CPU 106 to the IPC registers 156 and to the MCU ARM 128 to allow the MCU ARM 128 to proceed with reset operations.

The isolation warm reset initialization sequence of step 304 is illustrated in FIG. 5. In step 500 the switch CPU 106 restarts operation as its firmware code has been retained in the DRAM 114 as the indicated operation is a warm reset. The firmware for the switch CPU 106 would have been placed in the DRAM 114 during cold start operations. In step 502 the switch CPU 106 determines that this is a warm reset and in step 504 bypasses Ethernet switch 104 register configuration as the Ethernet switch 104 is operating. In step 506 relevant address lookup engine (ALE) or packet classifier entries and routing tables and the like in the Ethernet switch 104 that are relevant to the use of the internal port 132 of Ethernet switch 104 are cleared. The packet classifier entries and routing tables for external Ethernet ports are maintained to allow ongoing operation of the Ethernet switch 104.

The reset recovery sequence of step 306 is illustrated in FIG. 6. In step 600 flow configurations, such as DMA queues and flow ids, to allow traffic between the switch CPU 106 and the Ethernet switch 104 via the internal port 132, are configured. In step 602 receive and transmit DMA channels in the UDMA controller 105 are set up. In step 604 the operation of the internal port 132 is enabled to allow data communications to occur from the remainder of the integrated SoC 100 to the Ethernet switch 104. This involves deactivating the isolation modules 130 and 154 and setting the internal port 132 to a forwarding state. In step 606 the software state of the switch CPU 106 is restored from the nonvolatile memory 150.

It is understood that the above description is for a warm reset condition, where the integrated SoC 100 has previously completed a cold or power up reset, where all portions of the integrated SoC 100, including the Ethernet switch 104 and switch CPU 106, perform normal cold reset operations.

FIG. 7 illustrates the dynamic core attached handling sequence of step 308. In step 702 the switch CPU 106 allocates the various DMA channels and flow ids used to allow the integrated SoC 100 to communicate through the Ethernet switch 104 to the remainder of the processing modules present in the automobile. In step 703, other processors in the integrated SoC 100, such as the MAIN ARM cores 108, allocate the various DMA queues that are needed and that cooperate with the Ethernet switch 104 and provide that information to the switch CPU 106. In step 704, the switch CPU 106 associates the allocated DMA queues with the allocated DMA channels and flow ids. In step 706, the switch CPU 106 adds the various ALE and packet classification rules, routing table entries and so on for mapping traffic to the flow. Thus, in step 708 traffic flow from the MAIN ARM cores 108 and the UDMA controller 105 has been re-enabled and the Ethernet switch 104 is fully operational with the remaining portions of the integrated SoC 100. As discussed above, this dynamic core handling sequence is performed for each processor core that is involved in flows with the Ethernet switch 104.

Figure 8:
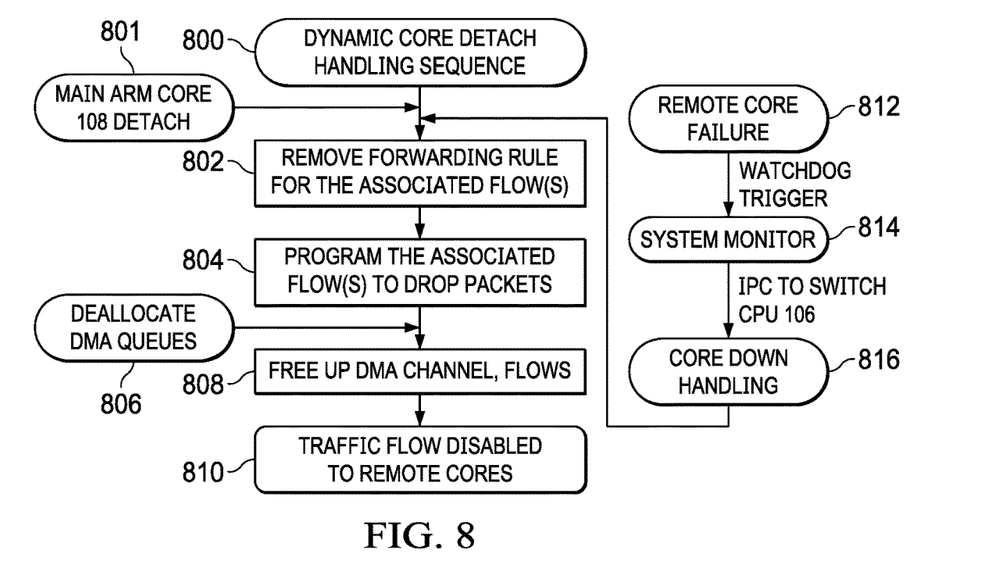
FIG. 8 is a flowchart of dynamically detaching a processor core from the Ethernet switch.

Just as the various MAIN ARM cores 108 can dynamically attach to Ethernet switch 104, as indicated by the dynamic core attach sequence of step 308, FIG. 8 illustrates the dynamic core detach handling sequence 800. In step 801 the relevant MAIN ARM core 108 determines that it wishes to detach from the Ethernet switch 104 and informs the switch CPU 106. In step 802, the switch CPU 106 removes the forwarding rules for the flows associated with the particular core that has detached. In step 804, the Ethernet switch 104 is configured by the switch CPU 106 to drop any packets that may remain for the flows that were removed in step 802. In step 806, the MAIN ARM core 108 deallocates the DMA queue as part of its detaching sequence. In step 808, the switch CPU 106 frees up the DMA channels and the flows for use by other devices. Thus, in step 810 the traffic flow has been disabled with the relevant MAIN ARM core 108.

Should one of the MAIN ARM cores 108 fail, as indicated in step 812, a watchdog timer (not shown but in the peripheral module 124 or associated with the relevant core) expires and provides an indication to the MCU ARM 128, in step 814. In response to the watchdog timer, an IPC indicating the watchdog timeout is provided to the switch CPU 106 through the IPC registers 156. A particular IPC is utilized from the IPC registers 156 to indicate that the relevant ARM core 108 has failed and is being reset in step 816. In step 802 the switch CPU 106 begins removing the rules associated with the flows for the core that is being reset.

For use cases that require the switch CPU 106 functionality also be power isolated and the switch CPU 106 always be operational with the Ethernet switch 104, an isolation module is provided between the switch CPU 106 and the MAIN data network 116 and the Ethernet switch clock is provided to the PLL 148. A direct path is provided between the switch CPU 106 and the Ethernet switch 104 as the MAIN data network 116 is isolated. The MCU ARM 128 performs various of the switch CPU 106 functions described above, such as handling the isolation of the Ethernet switch 104 and the switch CPU 106, with steps 204, 206 and 210 no longer needed. The MCU ARM 128 directs the switch CPU 106 to perform step 506 and to disable the internal port 132 prior to isolating the Ethernet switch 104 and the switch CPU 106. Steps 404 and 406 are no longer needed. None of the steps of FIG. 5 are needed, except that step 506 has been performed prior to isolation. The operation of the reset recovery sequence 306 is slightly altered so that the MCU ARM 128 removes isolation prior to step 600 and step 606 is not needed as the switch CPU 106 never lost state.

While the above description has focused on use in an automobile, it is understood that the integrated SoC as described above where the Ethernet switch remains operational while other portions of the integrated SoC are reset or otherwise not available can be used in many other areas where the removal of a dedicated, separate Ethernet switch is desirable.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. A system comprising:
a switch;
a switch processing unit;
a main subsystem including at least one operating component, the main subsystem integrated with the switch and switch processing unit into a system on a chip (SoC) device; and
a processor coupled to the switch processing unit, and integrated into the SoC device, the processor configured to:
in response to receiving a reset request from a source, transmit a notification to the switch processing unit;
wherein the switch processing unit is configured to, in response to the notification, isolate the switch electrically from the main subsystem and then generate a reset isolation complete signal; and and wherein the processor is configured to, in response to receiving the reset isolation complete signal from the switch processing unit, transmit an acknowledgement to the source.

2. The system of claim 1, wherein:
the switch is an Ethernet switch.

3. The system of claim 1, wherein the switch processing unit is further configured to, in response to the notification: save a state of the switch processing unit.

4. The system of claim 3, wherein:
the switch includes an internal port and an isolation module; and
the switch processing unit is configured to isolate the switch by placing the internal port in a non-forwarding state and activating the isolation module.

5. The system of claim 3, wherein:
the state is saved to a non-volatile memory coupled to the system; and
the state includes:
switch startup configuration information;
updated switch configuration information; and
state information for switch control protocols executing on the switch processing unit.

6. A system, comprising:
a switch;
a switch processing unit; and
a processor coupled to the switch processing unit, the processor configured to:
receive a reset request from a source;
in response to receiving the reset request, transmit a notification to the switch processing unit, wherein the notification causes the switch processing unit to perform a reset isolation sequence, and wherein the switch processing unit generates a reset isolation complete signal in response to completing the reset isolation sequence; and
in response to receiving the reset isolation complete signal from the switch processing unit:
transmit an acknowledgement to the source; and
and wherein, in response to the processor receiving the reset isolation complete signal from the switch processing unit, the switch processing unit is configured to:
reboot and perform an isolation warm reset initialization sequence;
perform a reset recovery sequence; and
perform a dynamic core attached handling sequence.

7. The system of claim 6, wherein:
the isolation warm reset initialization sequence includes clearing switch routing entries associated with an internal port of the switch.

8. The system of claim 6, further comprising:
a unified direct memory access (UDMA) controller associated with direct memory access (DMA) channels including a receive DMA channel and a transmit DMA channel.

9. The system of claim 8, wherein:
the reset recovery sequence includes:
enabling operation of an internal port;
deactivating an isolation module; and
restoring state information of the switch processing unit from a non-volatile memory.

10. The system of claim 8, wherein:
the dynamic core attached handling sequence includes:
allocating a subset of the DMA channels to the processor;
allocating, by the processor, DMA queues to form DMA queue information and provide the DMA queue information;
associating, by the switch processing unit, the DMA queues with the DMA channels; and
providing routing table entries to the switch.

11. A method comprising:
receiving, by a processor, a reset request from a source;
in response to the receiving the reset request, transmitting, by the processor, a notification to a switch processing unit associated with a switch, the switch processing unit, switch, and processor being integrated into a system on a chip (SoC) device;
in response to the notification, isolating, by the switch processing unit, the switch electrically from a main subsystem integrated into the SoC device;
then generating, by the switch processing unit, a reset isolation complete signal;
and
in response to the reset isolation complete signal, transmitting, by the processor, an acknowledgement to the source.

12. The method of claim 11, wherein:
the switch is an Ethernet switch.

13. The method of claim 11, further comprising:
in response to the notification, saving, by the switch processing unit, a state of the switch processing unit.

14. The method of claim 13, wherein:
the switch includes an internal port and an isolation module; and
isolating the switch includes placing the internal port in a non-forwarding state and activating the isolation module.

15. The method of claim 13, wherein:
the state is saved to a non-volatile memory; and
the state includes:
switch startup configuration information;
updated switch configuration information; and
state information for switch control protocols executing on the switch processing unit.

16. A method, comprising:
receiving, by a processor, a reset request from a source;
in response to the receiving the reset request, transmitting, by the processor, a notification to a switch processing unit associated with a switch;
in response to the notification, performing, by the switch processing unit, a reset isolation sequence;
generating, by the switch processing unit, a reset isolation complete signal in response to completing the reset isolation sequence;
receiving, by the processor, the reset isolation complete signal; and
in response to receiving the reset isolation complete signal from the switch processing unit:
rebooting by the processor;
rebooting by the switch processing unit;
performing, by the switch processing unit, an isolation warm reset initialization sequence;
performing, by the switch processing unit, a reset recovery sequence; and
performing, by the switch processing unit, a dynamic core attached handling sequence.

17. The method of claim 16, wherein:
the isolation warm reset initialization sequence includes clearing switch routing entries associated with an internal port of the switch.

18. The method of claim 16, wherein:
the switch is coupled to a unified direct memory access (UDMA) controller associated with direct memory access (DMA) channels including a receive DMA channel and a transmit DMA channel.

19. The method of claim 18, wherein:
the reset recovery sequence includes:
    enabling operation of an internal port;
    deactivating an isolation module; and
    restoring state information of the switch processing unit from a non-volatile memory.

20. The method of claim 18, wherein:
the dynamic core attached handling sequence includes:
    allocating a subset of the DMA channels to the processor;
    allocating, by the processor, DMA queues to form DMA queue information and provide the DMA queue information;
    associating, by the switch processing unit, the DMA queues with the DMA channels; and
    providing routing table entries to the switch.

21. The method of claim 11, further comprising, in response to the reset isolation complete signal:
    rebooting the processor;
    rebooting the switch processing unit; and
    clearing, by the switch processing unit, switch routing entries associated with an internal port of the switch.

22. The system of claim 1, wherein the processor is further configured to reboot in response to receiving the reset isolation complete signal;
    and wherein the switch processing unit is further configured to, in response to the processor receiving the reset isolation complete signal:
    reboot; and
    clear switch routing entries associated with an internal port of the switch.

* * * * *